United States Patent [19]

Black et al.

[11] 4,068,905
[45] Jan. 17, 1978

[54] DETACHABLE ROAD PROTECTING DEVICE FOR TRACKED VEHICLES

[76] Inventors: Chester A. Black, 6303 W. 159th St., Rte. No. 1, Stilwell, Kans. 66085; Lester A. Black, 1106 Second St., Alva, Okla. 73717

[21] Appl. No.: 612,217

[22] Filed: Sept. 10, 1975

[51] Int. Cl.² ............................................. B62D 55/28
[52] U.S. Cl. ..................................................... 305/51
[58] Field of Search ....................... 305/51, 54, 37, 38; 152/225 R, 218

[56] References Cited

U.S. PATENT DOCUMENTS

| | | | |
|---|---|---|---|
| 2,761,744 | 9/1956 | Atkinson | 305/38 X |
| 2,969,258 | 1/1961 | Murray | 305/51 X |
| 3,058,783 | 10/1962 | Wadsworth et al. | 305/51 |

*Primary Examiner*—Robert B. Reeves
*Assistant Examiner*—John P. Shannon
*Attorney, Agent, or Firm*—Thomas M. Scofield

[57] ABSTRACT

Improvements in road-protecting devices for tracked vehicles which are removably secureable to individual elements of the tracks; heavy-duty road-protecting devices removably secureable to individual elements of endless tracks which permit the vehicle to be actually worked under heavy load without losing the removably secured road-protecting devices; Improved tensioning and connecting elements for such road-protecting devices, which, in the portions thereof vulnerable to heavy load or impacts, are largely or entirely located out of the load thrust lines of use, whereby the said devices may be formed or composed entirely of resilient, deformable rubber or plastic without requiring therewith base or cover plates or bolts or ties associated therewith; nonextensible elements of rigid or non-rigid character adapted to be received fully within the bodies of resilient road-protective devices which are inside of or incorporated within the load thrust lines of use, yet which are of such character as not to be vulnerable thereto or reduce the road-protecting capacities of the protective devices, said nonextensible elements cooperating with additional tensioning and connecting means located out of the stress and load thrust lines of use; improved resilient tensioning devices associated with such road-protecting devices which retain engagement on individual endless track elements despite temporary relief of tension on one or more thereof or collapsing of one or more thereof due to turning of or maneuvering of the tracked vehicle; such road-protecting elements, pads or devices having associated therewith nonextensible connecting elements extending therethrough being usable with extraordinarily powerful resilient springs or rigid engaging devices which may or may not be variably adjustable, in order to provide such road protecting devices usable with heavy duty working vehicles, not just for nonworking or unloaded travel on roads or the like.

3 Claims, 27 Drawing Figures

DETACHABLE ROAD PROTECTING DEVICE FOR TRACKED VEHICLES

THE PRIOR ART

This application is an improvement over U.S. Patent Application Ser. No. 469,092, filed May 13, 1974, abandoned, for "Detachable Road Protecting Device for Tracked Vehicles", inventors Chester A. and Lester A. Black, this application continued as U.S. Ser. No. 590,617, filed June 26, 1974 U.S. Pat. No. 4,027,925.

The prior art has generated many approaches to the problems of protecting streets, roadways, pavements, and the like against the cleats of endless tracked vehicles. Thus, Benson 2,369,130, issued Feb. 13, 1945 "Reinforced Rubber Tread for Track Shoes" discloses preferred rubber tread materials to be used with the track shoes of track laying vehicles.

Integrally molded, composite track blocks or elements having resilient material coupled with rigid track elements or strucure are seen in numerous patents, for example Leguillon et al 2,409,502, issued Oct. 15, 1946 for "Track for Self-Laying Track Type Vehicles". Also see Batur et al 3,148,921 "Endless Track Chain and Link", issued Sept. 15, 1964.

Pneumatic tire elements, supports or the like have been provided associated with endless track elements as in Aukland 2,254,787 "Tractor Tire", issued Sept. 2, 1941 and Sayler 2,359,586, issued Oct. 3, 1944 for "Traction Device".

Patents showing resilient pads or tread attachments mounted on or supported by metal plates and molded to individual endless track elements are legion. Representative of these are the patents to White 1,635,596 "Rubber Tread Attachment for Track Links", issued July 12, 1927; Wadsworth et al 3,117,824 issued Jan. 14, 1964 for "Accessory Traction Units"; Wadsworth et al 3,058,793 "Accessory Traction Units", issued Oct. 16, 1962; Ruf 3,017,225 "Track-Chain Link", issued Jan. 16, 1952 and Kaifesh 3,475,060 issued Oct. 28, 1969 for "Self-Cleaning Track Snow Pad for Track Laying Vehicles".

Predecessor metalic bolt-on units to the latter, called "Street Plates" are seen in the patents to Panzegrau 2,028,346 "Street Plate for Track Shoes", issued Jan. 21, 1936 and Schmeiser 2,044,918 "Street Plate for Track Type Tractors", issued June 23, 1936.

A snap-in protective tread element is seen in Baker 2,686,697 "Tread Construction", issued Aug. 17, 1964.

Street plates and protective pad elements also are known which laterally engage the side edges of a track element, as seen in Reider 2,161,486 "Street Plate for Tractors", issued June 6, 1939; Saives 1,568,090 "Endless Track Vehicle", issued Jan. 5, 1926; Frech Pat. No. 748,081 to LaPorte of June 28, 1933 and Eichweber 2,869,932 "Detachable Road Protecting Device . . . " issued Jan. 20, 1959. Similar to these latter constructions is the "Detachable Traction Lug" of Beach U.S. Pat. No. 2,129,557, issued Sept. 6, 1938.

The patent to Padilla No. 3,666,327 "Track Shoe Protector", issued May 30, 1972 shows a resilient block of material having integrally formed attachment lugs at its sides for engaging the side edges of a track element.

BRIEF DESCRIPTION OF THE INVENTION

It has long been known to the prior art that endless tracked vehicles, such as bulldozers, tractors and the like, will objectionably damage certain surfaces if driven thereover, such as roads, flooring, certain foundations, parking lots, etc.. This damage will take place even where the vehicle is totally unloaded merely from the inherent weight of such vehicles and the nature of their tracks and track elements.

It is also old in the prior art to attempt to provide resilient rubber or plastic composition pads for removable attachment to individual track segments, shoes or tread plates, whereby to attempt to cushion the impact of such vehicles on the surface being traversed, indeed, maintain the track itself entirely out of contact with such surface or road. Numerous prior art devices are seen in the patents listed in the preamble of this specification directed to this problem.

Unfortunately, these prior art devices have not solved the problem. While it is clear to the art that a resilient pad portion for a protector may be provided, almost invariably, such devices incorporate rigid over or under plate foundations or protectors. Yet further, the means for attachment of such devices, while many and ingenious, also have objectionable features which have prevented the commercial and practical adoption of the prior art devices.

Additionally, the provision of the capacity merely to traverse vulnerable surfaces on protective pads or like devices is often not sufficient advantage to justify the expense of the owner or operators of such vehicles investing in complete sets of road protective devices for each track element of paired track vehicles or every other one of same, etc.. An additional facet or dimension of usability and usefulness is generally required. Specifically, that is, such road-protective devices while necessarily easily applicable to and removable from the track element, additionally must permit either or both of loaded travel of the vehicle with respect to such vulnerable surfaces and/or maneuvering (even if limited) of the vehicle on such surfaces, loaded or not. The optimum solution to the problem would involve resilient rubber or composition pad protective devices readily attachable to and removable from individual track elements of endless track vehicles, which pads or elements and their attachments to the track elements are sufficiently rugged that loaded operation and maneuvering of the vehicle on the vulnerable surfaces will be practical for extended periods of time without loss of or damage to the protective devices or their attachments and, certainly, not to the road or other vulnerable surface on which the vehicle is traveling and/or working.

The optimum ideal in such situation is to provide such resilient rubber or composition pads for attachment to individual track segments, shoes or tread plates which are readily attachable to and removable from the said track elements, yet which, in effect, are as strong, rugged and enduring essentially as the track elements themselves. With this sort of protective device, the versatility and usability of such vehicles vaults into entirely new realms and dimensions of practical activity. However, the conditions and requirements for such pads, their tensioning and connecting means as well as securing means, are of the utmost stringency and rigor.

The devices and constructions of the U.S. patent application to Chester A. and Lester A. Black, Ser. No. 469,092, filed May 13, 1974 for "Detachable Road Protecting Devices for Tracked Vehicles" (of which the instant case is an improvement), discloses, shows and describes such road protective devices which will permit endless tracked vehicles to travel and, to a limited degree, work and maneuver on vulnerable surfaces.

However, in most cases, the heavier levels of work and operation, as projected above, are not encompassed. It is the purpose of the instant disclosure and specification to provide devices, connecting means, tensioning means and engaging means which fully meet these most exacting goals and specifications above defined.

In view of the above facts and for other reasons, the prior art concepts of protective pads applied to all or a multiplicity of the track plates or track segments of an endless tracked vehicle have never come into accepted general use for either light or heavy duty application. In place thereof, planks, tire casings, and the like are conventionally used, which means are often not readily available, or require transport thereof to the site of use as well as storage thereat.

Specifically, with respect to certain prior art forms, the incorporation of rigid elements with a protector or pad, the rigid elements either overlying or underlying the pad, almost invariably prevents or makes exceedingly difficult the use of such devices with a vehicle which has been operating in mud, aggregate, asphalt, or the like, where deposits of such material, or any material, may have adhered to the tracks. The necessity of cleaning off a multiplicity of track plates or segments in order to briefly apply (or apply at all) protectors to the endless track is so laborious and time consuming as not to be feasible. For example, cleaning off individual track elements of such materials to clear and get at bolt holes through the track elements may in some circumstances may actually not be feasible under working conditions or on site.

Yet further, the attaching means for such protectors, as seen and shown in the prior art device, also, almost invariably, require excessively clean track segments for actual use of the attaching means or even applicability of the protectors or pads at all. Additionally, the provision of rigid or complicated attaching means such as shafts, spring loads, arms and the like which fall into the line of load of the tractor are highly objectionable because of their vulnerability to damage or destruction.

Accordingly, the instant improvement comprises resilient, flexible, deformable yet shape-retaining blocks or bodies of rubber or plastic material which are of a length to overlie a substantial portion of an individual endless track segment or plate on the outer surface thereof, with a width somewhat less than that of such plate or segment. Engaging means are provided capable of quick and ready attachment to and detachment from the side edges of individual track plates or segments. Strong, nonextensible means are provided positioned centrally of in said pads of such nature and character as not to either substantially change the protective capacity of the pad for the road surface nor to be vulnerable to the crushing loads transmitted into and through the pads themselves. Finally, engaging or tensioning means of varied character are provided laterally of the pads and protected by the profile thereof under load which, in combination with the edge connecting means and the nonextensible means in or over the pad, provide either an extraordinarily strong (though resilient) or entirely rigid connection or engagement of the pad with the track element it rides. The tensioning or engaging means between the track edge connectors and the nonextensible elements in or over the pad may be resilient, rigid, length-adjustable or incorporate an over-center device. The nonextensible elements may be rigid or nonrigid, either one.

OBJECTS OF THE INVENTION

A fundamental object of the invention is to provide improved detachable road protecting devices for tracked vehicles over those shown, disclosed and described in the U.S. patent application to Chester A. and Lester A. Black, U.S. Ser. No. 469,092, filed May 13, 1974 "Detachable Road Protecting Devices for Tracked Vehicles", particularly with respect to such devices usable under heavy duty conditions and on working vehicles.

Another object of the invention is to provide novel and improved detachable road protecting devices which may be readily removably mounted on the individual tracks, plates or shoes of endless tracked vehicles such as tractors, bulldozers, and the like.

Another object of the invention is to provide flexible, resilient, somewhat deformable (yet shape-retaining under heavy load) blocks of rubber or plastic material particularly adapted for use as road protecting devices when mounted on the individual track elements of endless tracked vehicles, together with novel and improved connecting, engaging and tensioning attaching means for same, which greatly improve over the prior art known devices for like purposes, particularly with respect to heavy-duty and working uses.

Another object of the invention is to provide such improved road protecting devices, which improved devices do not require or have any vulnerable, crushable, easily destructible elements, plates, structures or attaching means used or incorporated therewith or therewithin.

Another object of the invention is to provide such improved road protecting devices utilizing resilient, flexible, deformable, yet shape-retaining road protecting blocks, wherein such blocks of minimum width with respect to the track element width may be employed, yet wherein secure fastening is provided and full road protection is also available.

Another object of the invention is to provide such improved heavy-duty road protecting devices (removably securable to individual track elements on tracked vehicles) which are extraordinarily strong, very simple, relatively inexpensive, longlived under prolonged heavy-duty use, weather resistant, and effectively usable under the most extreme conditions to accomplish their desired purposes.

Another object of the invention is to provide such improved heavy-duty road protective devices adaptable for use with all of the various sorts of track elements conventionally employed on endless tracked vehicles such as tractors and bulldozers including standard and extreme service track shoes, as well as triple grouser shoes.

Another object of the invention is to provide such removably attachable, heavy-duty, road-protective devices all of which employ attaching, connecting and engaging means utilizing high tension and great force, yet wherein, because of the use of nonextensible elements of a particular character, said elements penetrating the pad or block in a certain manner, excessive stress and damage to the pad or block itself is minimized or avoided, even under heavy working conditions of the vehicle.

Another object of the invention is to provide improved connecting and attaching means for resilient, relatively deformable pads or blocks acting as road protecting devices, which attaching and connecting means are of the greatest strength, same largely positioned out of the load thrust lines of the vehicle or of such character and position in or on the block as to be impervious thereto, same readily replaceable and, further, readily associateable with extensions and supports so as to provide the greatest versatility and usefulness, as well as useability, in the heaviest service and working applications.

Another object of the invention is to provide such improved heavy-duty road protecting devices and attaching and connecting means therefor which, for the service provided, take up a minimum of space, have minimum weight, and are relatively cheap.

Other and further objects of the invention will appear in the course of the following description thereof.

In the drawings, which form a part of the instant specification and are to be read in conjunction therewith, embodiments of the instant invention are shown and, in the various views, like numerals are employed to indicate like parts.

DESCRIPTION OF THE DRAWINGS

FIGS. 1-6, INCLUSIVE

FIGS. 1-6, inclusive specifically show a track pad having a central, rigid connecting means extending therethrough, to the ends of which may be attached or removably hooked compression spring assemblies, solid hook elements or like devices.

FIGS. 7-11, INCLUSIVE (SOLID, BUT VARIABLY ADJUSTABLE CONNECTION)

FIGS. 7-11, inclusive are directed to a solid (nonresilient) attachment utilizing, on each side of the pad, boltnut engagements, the pad having a steel strip centrally thereof to which are welded or otherwise rigidly attached nuts to be engaged by the bolts carried by the track element edge engaging hook members.

FIGS. 12-17, INCLUSIVE (WITH OVER-CENTER DEVICE)

FIGS. 12-17, inclusive show various views of the improved pad utilizing an over-center engaging, connecting and locking means on one side of the pad and an extraordinarily strong, rigid and variably adjustable solid element on the other side of the pad.

FIGS. 19-22, INCLUSIVE (NONRIGID, NONEXTENSIBLE MEANS)

FIGS. 19-22, inclusive show alternative means to the block or pad contained rigid bar, strap or strip of FIGS. 9 and 10 and 12 and 13, namely, a cable in FIGS. 19 and 20 and a chain in FIGS. 21 and 22.

FIGS. 23-25, INCLUSIVE (MISCELLANEOUS)

GENERAL FEATURES

The various figures show relatively simple, relatively cheap, heavy-duty, working road-protecting devices readily adaptable to either standard service or extreme service track shoes, plates or elements. Endless tracks typically comprise elongate plates, generally of greater width than length, which are removably bolted or otherwise attached to an underlying drive structure. These plates articulate at their forward and rearward ends with one another and carry one or more ridges, cleats or spines extending across the width thereof. A standard service shoe has a lesser height single cleat, an extreme service shoe has a greater height single cleat and a triple grouser shoe typically has three ridges or cleats theracross, spaced apart on the working surface of the shoe. These are merely typical variations and are not limiting.

With respect to dimensions of the road protecting devices or pads, per se, to be described, all are significant. The length of the road protecting device in each case is preferably substantially the distance from cleat to cleat in succeeding track plates. Preferably, at least, the length of the pad is from the cleat or spine on the plate to the beginning of the arcuate part on the same plate so formed for mating with the succeeding plate. Said otherwise, the length of the road protective pad or element is preferably substantially equal to the length of the flat portion of the track plate on which it will rest, at least. The maximum feasible length is the cleat to cleat distance.

With respect to height of the pad or protective device, in a triple grouser shoe, where the pad or protective device is going to overlie at least one and possibly two of the cleats, the height or thickness of the pad need only be such (over the cleats) to provide the desired strength and resiliency, while the total height from the lands or valleys between the grousers will be that thickness plus the depths of the lands or valleys. On the other hand, where the cleat is of standard or extreme height, the thickness or height of the road protective pad or device must be substantially greater than the height of the cleat, ridge or spine on the track plate so that, even under the load compression of the vehicle (which will be spread over numerous of the road protective devices at any one moment), the cleats or ridges do not contact the surface being traversed. Since there is no reason to provide any substantial compressibility of the devices, the height of the grouser or cleat need not be exceeded by more than one to two inches in most cases.

The width of the road protective devices or pads, in all modifications, is going to be less and, in most cases, substantially less than the width of the tracks on which they sit. It is the combination of the length and width plus the number of road protecting devices applied to a given track which provides the square footage of bearing area. There must be enough (a sufficient number) of the road protective pads or devices, with a sufficient cross-sectional bearing area, that even the less resilient materials will not be simply squashed flat or cleat contact permitted. Since there are two tracks and a multiplicity of track elements, the number of protective devices used can be adjusted to the total weight of the vehicle (with positioning every second element, every other element, or, for that matter, every element — on both sides) that any conceivable vehicle loading can be handled. This may be important or critical in the case of extremely heavy, massive, tracked vehicle equipment. In the case of working or loaded vehicle protective device arrays, it is very common for at least every other element or every element on both sides of the track to be provided with the said pads or protective devices.

At any rate, the first consideration of width is that the block or road protective device not be wider than the track in any case. The entire body of the device may closely approach the width of the track. On the other hand, the width may be considerably less than the track width. Generally speaking, it is desired to have the device as wide as possible, subject to providing track edge engaging connecting means of the desired strength, type and versatility for the particular heavy-duty or working situation in question.

Summing dimension, generally speaking, the length of the device will approach the cleat to cleat as closely as possible, preferably, and at least incorporate the length of the flat portion of the track plate on which the device or pad will rest. Since there is some resiliency, and since powerful connecting and engaging means are employed, an absolute flat surface rest is not required. Strong, powerful and variably adjustable engaging, connecting and tensioning devices may be employed which will pull the device down flush on the track element. With respect to height, that height must be provided which will space the tracked vehicle up above the surface being traversed enough that the cleats do not abrade or cut into the surface. Higher cleats require greater thickness or height in the road protective device or pad. However, the road protective devices can, if desired, always be provided in the greatest useful height and still serve with lesser height grousers or cleats efficiently and effectively. With respect to width, generally speaking, the maximum width with respect to a given width track is generally best, subject to the limitations mentioned above with respect to the edge connecting, engaging and tensioning devices employed with the block or device. However, as will be described, protective devices of very considerably lesser width will serve, per se, if positioned staggered alternatively between adjacent blocks, positioned asymmetrically on the track, or the like.

Typical spine to spine or cleat to cleat distances on tracks will run 5 inches to 8 inches, typically 6 inches. Track widths in crawler tractors will run, typically, from 12 inches to 30 inches, most approximately 18 inches to 22 inches. Three inch cleat or grouser heights are extraordinarily and a 3 inch thickness device will easily handle most cleat heights. All-purpose protective devices of transverse and vertical rectangular section would conveniently be $5\frac{3}{4} \times 9 \times 3$ inches or $6\frac{1}{2} \times 14 \times 3\frac{1}{4}$ inches. These all-purpose devices may be used with a variety of attaching and tensioning means to fit different width tracks as will be described.

With respect to the shape of the road protecting devices or pads in question, most preferably (since the areas on which the devices ride are rectangular) same are blocks rectangular in transverse and vertical section. The edges in all cases may be rounded and the devices may be frusto-conical in both side and end section. The latter, however, is not preferable, because it is desired to have equal bearing areas on the road surface and the tracks, or substantially the same. In a rectangular pad and outer face may be beveled flatly at all four edges, if desired.

FIGS. 1–6, INCLUSIVE

Figure 1:
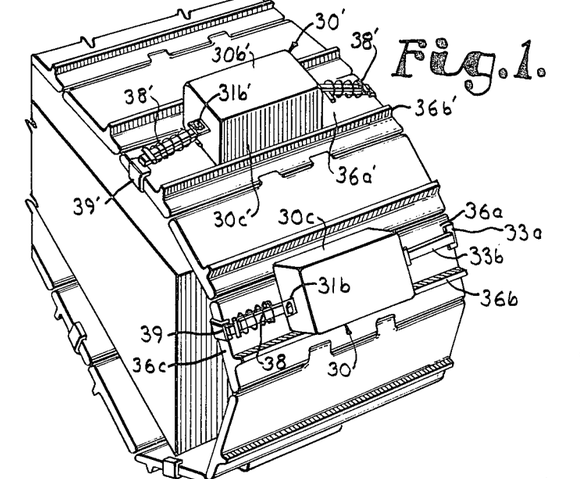
FIG. 1 is a three-quarter perspective view from above of a portion of an endless track (somewhat stylized) on an endless tracked vehicle, every other element having the subject pads thereon, one of them having two lateral compression spring attaching elements (see FIG. 6), another one a lateral compression spring element and a solid attachment (FIGS. 4 and 5).
Figure 2:
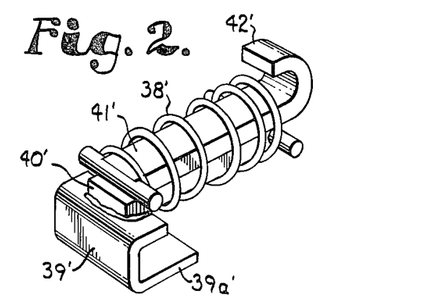
FIG. 2 is a three-quarter perspective view from above of a compression spring unit usable with the pad construction of FIGS. 1-6, inclusive.
Figures 3, 4:
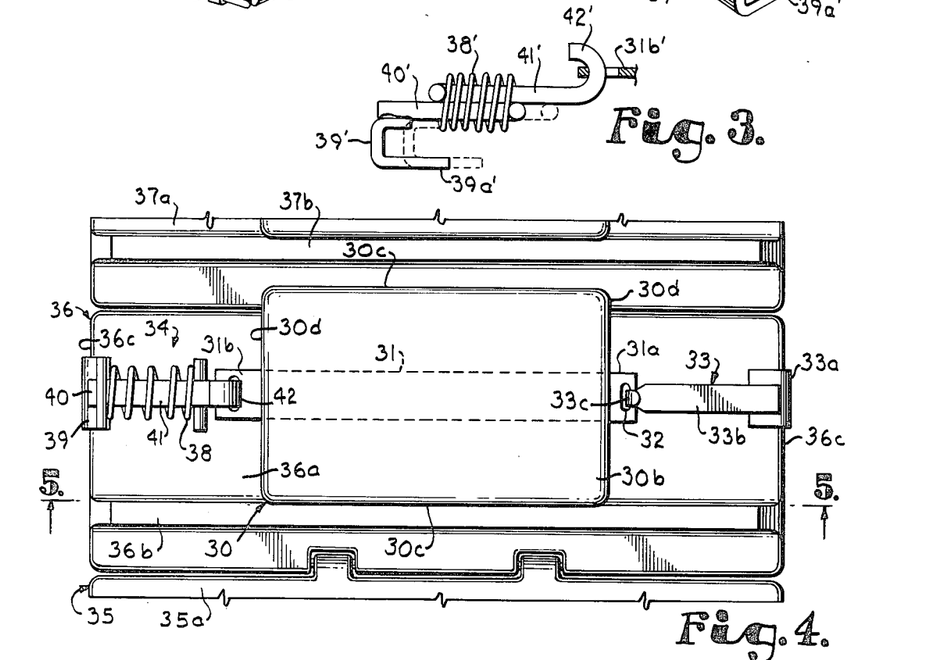
FIG. 3 is a side view of the unit of FIG. 2 showing the spring partially collapsed in full lines.
FIG. 4 is a plan view of a track element of an endless track showing the subject pad having the rigid reinforcement through the center thereof and engaged at the sides thereof by, respectively, a compression spring unit and a solid element.
Figure 5:
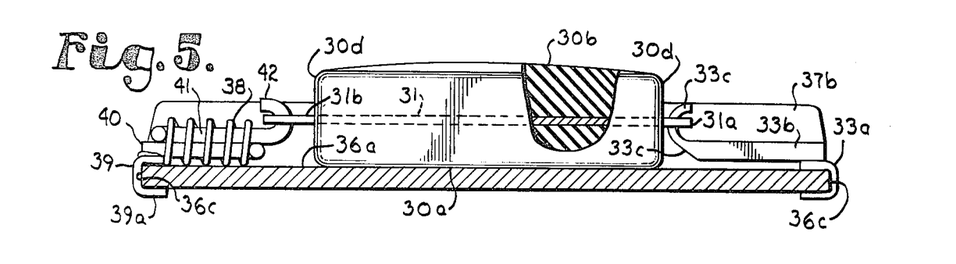
FIG. 5 is a view taken along the line 5—5 of FIG. 4 in the direction of the arrows.
Figure 6:
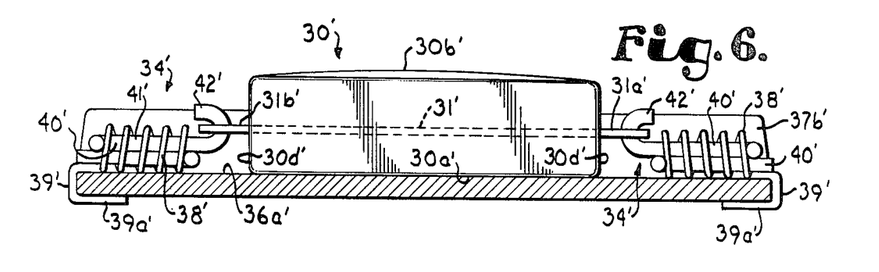
FIG. 6 is a view like that of FIG. 5, but showing a pair of compression spring elements mounting the pad on the track, the said compression spring units so sized in their track engagement that full compression (with full collapse of the spring thereof) of one of the compression units will not permit removal of the pad-connection assembly from the track.
Figure 7:
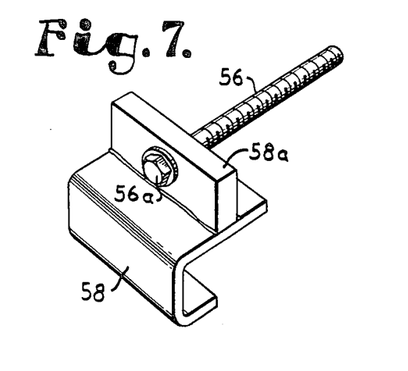
FIG. 7 is a three-quarter perspective view from above of one of the track edge engaging hooks or elements with a bolt removably and rotatably engaged therewith.
Figure 8:
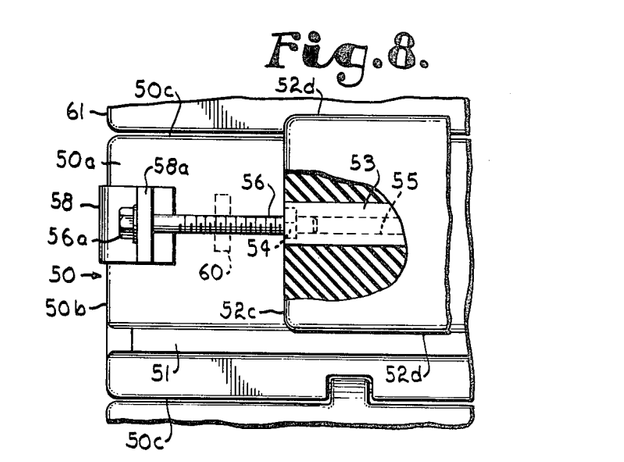
FIG. 8 is a fragmentary plan view of a modified, improved pad (differing from that of FIGS. 4-6, inclusive) in having centrally thereof a rigid metal bar, strap or strip with depending nuts welded or otherwise fixedly attached to the ends thereof. In the view threaded bolts are shown engaging the latter with inboard portions and, outboard, engaging track edge clamping elements as seen in FIG. 7. A portion of the pad is cutaway in the view to better illustrate the relationship of the parts.

FIGS. 1–6, inclusive, particularly FIGS. 4–6, inclusive, illustrate a first form or type of heavy-duty, working type of road protective device or pad, together with the means for connecting the pad to and tensioning same on the individual track element of the endless track. Specifically referring to FIGS. 4–6, inclusive, therein is seen a pad comprising a monolithic block construction having substantially flat, parallel top and bottom sides 30a and 30b of rectangular shape, flat, substantially parallel and rectangular ends 30c and flat, parallel, rectangular, side surfaces or walls 30d. Integrally molded into and through pad 30, extending lateraly from side to side thereof, and preferably centrally positioned both with respect to end walls 30c and top and bottom walls 30a and 30b, there is provided rigid, typically metal, such as spring steel, elongate, nonextensible bar, strip or strap 31. This rigid, nonextensible strap 31, of high strength material, preferably is of a length greater than the width of pad 30, whereby end pieces of portions 31a and 31b extend larterally past side faces 30d of pad 30. Slots or openings 32 are preferably provided in strap 31 in the free portions 31a and 31b thereof. Alternatively (not shown), the pad 30 may be relieved inwardly of the sides 30d so that strap 31 only extends to the side faces thereof, whereby the openings 32 will be positioned inboard or inward of side faces 30d. This, however, is not preferred.

In the event a material is available for fabrication of strap 31 which is of sufficient strength and non-extensibility, same may be resilient transverse to its longitudinal axis. The necessary criteria for strap 31 are non-extensibility under heavy longitudinal load and great strength.

In FIGS. 4 and 5, in the views on the righthand side of pad 30 there is provided a rigid, nonlength-adjustable hook member generally designated 33, while on the lefthand side of pad 30 there is provided a coil spring tensioning and engaging means generally designated 34.

In the view of FIG. 4, three track elements, numbered 35, 36 and 37, respectively, are seen, only portions or fragments of elements 35 and 37 visible. Track element 36 has substantially flat portion 36a, at one end of which is provided cleat or grouser 36b. Track elements 35–37, inclusive are coupled to one another and the underlying drive structure in conventional manner and by conventional means which will not be here described.

The rigid element 33 and the coil spring attachment means 34 of FIGS. 4 and 5 connect to and engage between the side edges 36c of track element 36 and the free ends 31a and 31b of strap 31. Specifically, looking to the right in FIGS. 4 and 5, a C-shaped hook element or member 33a removably engages one track element edge 36c. Welded or otherwise fixedly attached to hook member 33a is a J-shaped element or piece 33b which is welded or otherwise fixedly attached to member 33a and removably hooks through or engages opening 32 in portion 31a of strap 31.

In the lefthand side of FIGS. 4 and 5, the coil compression spring engaging and tensioning unit 34 is constructed, typically, as follows. Coil compression spring 38 is engaged by upper and lower members which spring 35 encircles, at least in part. The lower member is made up of a C-shaped hook element 39 to which is welded or otherwise fixedly attached a T-configured member 40. The upper member of those encircled by coil spring 38 comprises a T-shaped element 41 of like structure to element 40 on the end of which or to the end of which is provided or formed a hook 42 operable to removably engage opening 32 in portion 31b of strap 31.

The detailed construction of such a coil compression spring unit is shown in FIGS. 2 and 3. However, the unit specifically illustrated in FIGS. 2 and 3 is that which is used in the double compression spring unit attachment of FIG. 6 to be immediately described.

The material of the pad, protective device or block 30 may be rubber, reinforced rubber, monolithic rubber of laminated slabs of rubber vulcanized to one another. Additionally, the pads, blocks or devices may be of suitable plastic, reinforced plastic, rubber substitute (such as neoprene), or the like. Reinforcements in the rubber, neoprene, synthetic or plastic body may be fiberglass, resilient threads or cloth made up of resilient threads, nylon fibers and the like. Under the compressive load of the tracked vehicle to which the pads 30 are attached, the bock must be somewhat resilient and deformable, at least slightly flexible.

The essential improvement of the device of FIGS. 4 and 5 over the prior art and, particularly, those devices for related purposes seen in the application of Black et al, S. N. 469,092, filed May 13, 1974, supra, lies in the provision of the thin, narrow, nonextensible strap or member 31 in the pad 30, to which the connecting and tensioning means positioned laterally of pad 30 are coupled. That is, the hooks 33a (of rigid element 33) and 39 (of coil compression spring unit 34) engage the side edges 36c of track element 36. Then the coil compression spring unit 34 and the rigid element 33 connect these hooks, not to pad 30, per se, but to a nonextensible element received in and either formed integral with, glued to or otherwise fixedly attached itself to pad 30. All force and tension, in the gripping of the pad 30 to the track edges 36c and down onto the surface 36a of element 36 is exerted into and through element 31 and thence to the pad, not directly to the pad from members 33 and 34.

In this manner, where there is a coil compression spring unit 34 as at least one of the engaging, tensioning and connecting means involved in mounting and securing the pad 30 on track element 36, the most powerful compression spring, as well as forces, may be exerted in mounting the entire protective device on the track, dismounting same therefrom and maintaining same on the track in use and working of the tractor. Thus, a compressive force, via spring 38, may be exerted on the entire unit which requires the entire strength of a powerful man, exerted through a levering hook, to apply or disengage the entire unit on the track. In all of this application of force into the entire protective device unit, including its connecting and tensioning, as well as engaging means, no damage will take place in or to the pad itself because all these forces are contained within the connected system of elements 33, 31 and 34.

At the same time, it is most preferable that element 31 be of limited width with respect to the length of the pad and limited thickness with respect to the thickness of the pad, as well as centrally positioned therein. In this manner, a minimum effect of the presence of strap 31 is created with respect to the protective qualities and the effects of the pad itself in use and operation. Also important is the fact that the engaging, are positioned laterally of the pad within its protective profile. Thus, when the great loads, thrusts and impacts of the working vehicle are imposed on the pad in operation, the only element of the engaging, connecting and tensioning system (elements 31, 33 and 34) is the spring steel strap 31, itself within the pad and below its profile, as well as of great strength.

Referring to FIG. 6, the only basic difference in this view and in the structure therein compared to the structures of FIGS. 4 and 5 lies in the use of two coil compression spring units, one on each end of the pad, replacing the rigid hook unit 33. In view of this fact of identity, save for, additionally, an increase in length of one portion of the hooks engaging the track edges to be described, all of the parts in FIG. 6 are numbered the same as corresponding parts in FIGS. 4 and 5, but primed. The identical parts will not be again described in detail and the description of the corresponding parts thereto given with respect to the previous figures are herein incorporated by reference.

The main distinction, as noted, between the coil compression spring units or assemblies 34' of FIG. 6 and assembly 34 of FIGS. 4 and 5 lie in the extension 39a' of hook elements 39'. Extensions 39a' are of sufficient length that, when one of the coil springs 38' is completely collapsed solid upon itself, without compression or collapsing of the other compression spring 38', there will not be disengagement of either hook 39a from the track element 36. Specifically, when a lateral movement of the pad 30 is forced by some action of the vehicle to the extent that one of the springs 38' is completely collapsed, in one of the units 34', the opposite hook 39' and its member 39a will not disengage from the track edge, thus retaining the unit on the particular track element. Even with the use of extremely powerful and energetic coil compression springs, such action is possible, such as when an extremely heavy and/or heavily loaded vehicle is driven at an angle upon an angled surface.

Figure 2A:
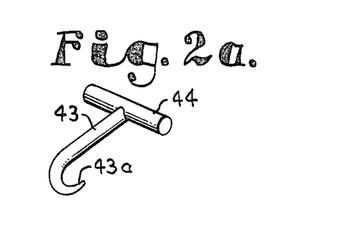

FIG. 2a shows a hook member 43 having a handle 44 fixed thereto which is particularly adapted to applying and removing of the road protecting device units seen in FIGS. 1-6, inclusive to track elements.

In the mounting of the assembly of FIGS. 4 and 5 on, say, track element 36, pad 30, with strap 31 fixed therein is first engaged with rigid hook member 33 and compression spring assembly 34. The assembly is then placed on the track element 36 with hook 33 engaging edge 36c of element 36. The hook end 43a of hook 43 is then engaged with hook 39 of assembly 34, with the operator grasping handle 44. By pulling along the axis of elements 33, 31 and 34 (to the left in FIG. 4), the compression spring unit may be collapsed sufficiently that hook 39 is snapped over the opposite track element edge 36'. In order to disengage the assembly, the hook 39, at the edge of element 39a or the side edge of the hook may be engaged by hook 43, portion 43a, and, again, the coil spring 38 compressed or collapsed sufficiently fro disengagement of hook 39 with edge 36c.

In FIG. 1, two pads, protective devices or blocks are seen in perspective, one mounted according to the teachings of FIGS. 4 and 5, the other, in the upper portion of the view, having two compression spring units at the sides thereof. The track elements and track pads referred to are numbered the same as the respective elements in FIGS. 4-6, inclusive. While such alternative mountings of track pads may be employed on a given endless track, generally speaking, and most preferably, all of the mountings will be the same so that the behavior of the individual pads may be predicted with respect to one another under the particular use to which the vehicle is being put.

Thus, in the devices of FIGS. 1-6, inclusive, an elongate, nonextensible element is received substantially centrally of and secured within the block, extending transversely from side to side of the block. Means are provided for removably connecting the nonextensible element to the opposite side edges of an individual track element, these means positioned laterally of the side faces of the block. Tensioning means are positioned laterally of the block on one or both sides thereof engaging one end of the nonextensible element with an inboard portion thereof and the connecting means with an outboard portion thereof. Said otherwise, individual hook means are positioned laterally of each of the side walls of the block (which receives and contains the elongate nonextensible element) in positive, removable engagement with the track element side edges. A separate connecting element communicates between and interconnects each said individual hook means and one end of the nonextensible element. The connecting elements, in their connection between the hook means and the nonextensible element, place the block under tension against the track element, thus retaining the block positioned on the outboard face of the track element.

FIGS 7-11, INCLUSIVE

The basic philosophy of a working road protecting device or pad, specifically, that is, one which may be used in heavy duty action and work of an endless tracked vehicle, is that the device, once mounted on the track, must be able to be fixed thereon against longitudinal thrusts and forces, lateral thrusts and forces and twisting or turning thrusts and forces. The devices of FIGS. 1-6, inclusive represent essentially the strongest snap-on type pads possible which incorporate a resilient or spring element. Thus, a compression spring assembly, as seen in FIGS. 2 and 3, may be employed therein which approaches the limits of strength of a strong human male, in handling, even using a leverage type hook device as seen in FIG. 2a. While the assemblages of FIGS. 1-6, inclusive will permit extended travel of endless tracked vehicles on conventional roads and vulnerable surfaces, even turning and maneuvering thereon, at least to a considerable extent, nevertheless, these road protecting device assemblages are not sufficiently rugged to qualify as true working pads of the type previously described. Accordingly, the remaining devices and systems as seen and described in this disclosure, all incorporate what may be essentially characterized as a rigid final mounting on the track element. That is, once the device is finally positioned and clamped, bolted or levered into place, there is a continuous, rigid, nonextensible coupling from one track element edge to the other. This does not mean that the nonextensible element within the pad or resilient block itself is necessarily completely rigid, only that is is completely nonextensible. However, as will be described and as is seen in FIGS. 7-11, inclusive, such nonextensible elements received within the pad may be rigid as was the specific case of element 31 in FIGS. 4-6, inclusive.

In the configuration of FIGS. 7-11, inclusive, there is shown such a rigid (nonextensible) track element edge-to-edge mounting involving a resilient pad, wherein each side of the connecting, engaging and tensioning means is length-adjustable. This permits the pad or block to be positioned centrally or to one side of the track element on which it is mounted. This is particularly useful when the pad or block is of considerably lesser width than the width of the track element on which it sits. In such case, all of the blocks or pads may be positioned adjacent the outside edge of the track element or, alternatively (see FIG. 26), adjacent or alternate track pads may be staggered with respect to one another on adjacent track elements.

At any rate, referring to FIGS. 7-11, inclusive, at 50 is generally designated a single endless track element having an outboard surface 50a, side edges 50b and a cleat or grouser 51 positioned normally thereto and adjacent one of the ends 50c thereof. A track pad or resilient block of the character previously described is mounted on tracke element 50 and generally designated 52. Pad 52 has top surface 52a, bottom surface 52b, side faces 52c and front and rear faces 52d. Molded integral with or otherwise fixed in pad 52 is elongate strap, strip or bar 53 which extends from one side face 52c to the other and is preferably substantially centered in the pad between the top and bottom walls 52a and b and the front and rear walls or faces thereof 52d. Strap 53 is preferably of some nonextensible, strong, optionally rigid material such as spring steel. Welded or otherwise fixedly attached to the underface thereof at the ends thereof are nuts 54. Passages 55 (or one such passage 55) extend inboard from the side walls or ends 52c axially in line with the internally threaded openings through nuts 54 in order to receive partially or wholly therewithin lengths of bolts 56 and 57 which threadably engage the nuts 54. The passage or passages 55 may be provided by drilling out the pad 52 or molding the pad with threaded members in engagement with nuts 54 and extending under strap 53, such threaded members later removed from engagement with nuts 54.

A pair of J-section hook or edge connecting members 58 and 59 are provided, each of which has a perforated flange 58a or 59a thereon adapted to receive therethrough and retain bolts 56 and 57 which have enlarged heads 56a and 57a. A protective nut 60, or several of them, may be threaded on one or both of bolts 56 or 57 after same are engaged through the openings in flanges 58a or 59a. Such nuts 60 will prevent or hinder bending or thread damage to bolts 56 and 57 in heaviest use.

Figure 9:
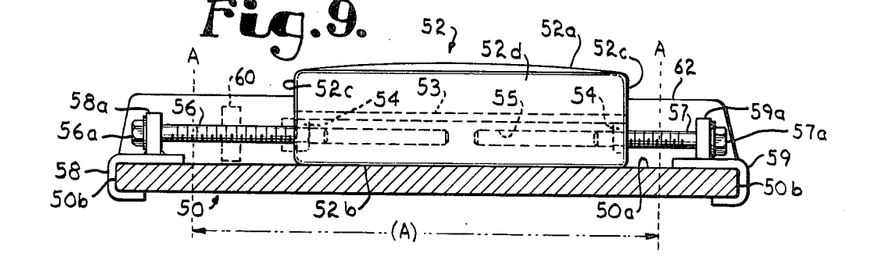
FIG. 9 is a front view of one endless track element showing both sides of the engagement of FIG. 8 with, in the view, the pad asymmetrically mounted on the track element, whereby, on the lefthand bolt, a bracing nut is shown in dotted lines.

In mounting of the assemblage of FIGs. 7-11, inclusive on a track element, such as element 50, most efficiently, each of the bolts 56 and 57 are threadably engaged in nuts 54 at extreme length extension. In this manner, the assembly may be laid on top of the track element top surface 50a and immediately thereafter, the hook members 58 and 59 moved into engagement with the track edges 50b by pushing them toward one another, moving flanges 58a and 59a along the threaded lengths of bolts 56 and 57. There remains only the necessity of turning down the bolts 56 and 57 into their engagement with nuts 54 (by use of suitable wrenches, socket wrenches or the like) so that, as is shown in FIG. 9, particularly, a tightly locked, rigid engagement involving the side edge hooks 58 and 59, flanges 58a and 59a, bolts 56 and 57 and strap 53 with nuts 54 is achieved. In order to move the pad 52 toward one edge or another, one bolt is slacked off, while the other is further engaged with its nut 54. Alternatively, the inboard bolt may be set at its desired final position and all adjustment and tightening handled through the outboard bolt for convenience.

In FIG. 9, pad 52 is positioned closer to the righthand edge of the track element 50 and bolt 56 is longer than bolt 57. Greater length bolts than those shown may be employed to give greater lateral movement versatility of pads 52 on the track. Specifically, for example, if bolt 57 was as long as bolt 56, pad 52 could be moved to either edge of the track on equal distance. The use of one or more support nuts 60 is preferred where there is a long extent of bolt shaft free between flange 58 and the side wall or face 52c of pad 52. In such case, with the presence of such typically square nuts of larger size than the height of flange 58a, for example, considerable support and protection is provided for the shaft of, say, bolt 56 from rocks, obstacles, and the like which the track element may pass over, yet which would fall between pad 52 and flange 58a.

Figure 26:
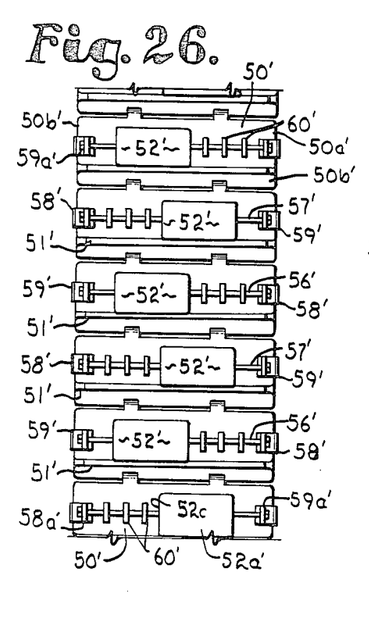
FIG. 26 is a plan view of a section of a track having the improved pads of FIGS. 9 and 10 mounted thereon, the pads staggered on alternate or adjacent track elements so that undersized (with respect to width) pads may be employed on track elements of great width.

FIG. 26 shows a plurality of quite small size, particularly lesser width, pads or blocks stagger-mounted on alternate track elements of an endless track. In each case, the use of three support nuts 60 on the one side having the longer bolt is shown. Since the construction of FIGS. 7-11, inclusive and 26 are identical, save for the number of nuts 60, all of the corresponding parts in FIG. 26 are numbered the same as corresponding parts in FIGS. 7-11, inclusive but primed. The point of using such relatively lesser width pads on great width track element of segments is that one set of pads thus can be used on a large variety of track widths for a given operator.

Comparing the constructions of FIGS. 1-6, inclusive and FIGS. 7-11, inclusive, in each case, the pad construction or block construction is essentially the same. In each case, an elongate, nonextensible element is received substantially centrally of the pad or block secured within the block and extending transversely thereof from side to side. In each case, the strap 31 and strap 53 have been shown as rigid, such as spring steel strips or bars. It would actually be preferable, if such material be available, that the strap 31 and/or strap 53 be somewhat flexible and resilient normal to the longitudinal axis of the strap. However, such strap must be of great strength against longitudinal elongation, that is, nonextensible and must maintain its structural integrity, as well as fixed length, under the longitudinal loads applied by the attaching means and the vertical, lateral, longitudinal and twisting stresses worked on the pad by the working of the vehicle and the movement of the elements of the track under heavy load. Accordingly, at present writing, spring steel is the best material, save for the options of FIGS. 19–22, inclusive to be described. Thicker mild steel may also be employed.

Means are provided for removably connecting the nonextensible element to the opposite side edges of the individual track element, such means positioned laterally of each of the side faces of the block or pad. In this specific case, these are the J-section hooks and the attached flanges 58a and 59a, together with the bolts 56 and 57. Further, tensioning means are provided which are positioned laterally of the block on each side thereof, engaging one end of the nonextensible element with an inboard portion thereof and the connecting means with an outboard portion thereof. This comprises the combination of elements involving nuts 54, bolts 56 and 57, flanges 58a and 59a and the hooks 58 and 59 which operate as base securements for the tensioning action which is the threading of the bolts into the nuts against the resistance provided by the flange 58a and 59a.

Essentially, the resilient, cushioning, protective action of the pad or blocks 52 is not effective by the elements therein, namely, strap 53 and nuts 54. It is contemplated that, in the manner of the strap 31 of FIGS. 1–6, inclusive that strap 53 be elongated so that nuts 54 are provided externally of the pad. When the bolts 56 and 57 are carefully sized with respect to such as arrangement, little or no extension thereof into the profile of the pad is necessary, whereby the pad itself is effectively free of mechanical elements therein, save for strap 53. The presence of strap 53, nut 54 and some inward extension of bolts 56 and 57 do not, because of the centering thereof, make the pad equivalent to a plate base or plate covered or solid street plate construction. It must be additionally understood, depending somewhat on the height of the grouser or cleat 51, that the height of the pad may be increased somewhat and the spacing or centering of the strap 53, nuts 54 and related parts varied with respect to the pad configuration to minimize the effect of the solid elements therein.

The entire purpose of a road protecting device assemblage as seem in FIGS. 7–11, inclusive is to provide an immensely strong, essentially indestructible road protecting device which still retains total road protecting character, even though massive, rigid structural elements are associated therewith. This is obtained by the centering and "immersion" of the strap 53 in the pad, the centering and "immersion" of the bolts 54 in the pad, the same with the bolts 56 and 57, as well as the lateral placement of the side engagement means within the profile of the resilient, deformable, flexible pad. Nevertheless, a totally solid, laterally adjustable, variable length connection, attachment and engagement, as well as tensioning means, is provided by this construction, fully suited for and providing a "working" road protecting device not having any limitation of even the powerful compression spring type elements of FIGS. 4–6, inclusive.

It should be understood that the optimum road protecting device of the form of FIGS. 8–11, inclusive contemplates the maximum width pad or block on a given track element, only sufficient clearance on the sides thereof provided to receive on the given track element 50 the J-section hooks and attached flanges and sufficient bolt lengths to give full tensionin capacity for a given pad. To show such optimum width, the arrow (A) between the lines A—A of FIG. 9 is provided showing such an optimum width for the track element 50. However, it should be understood that, if the given track element 50 was the largest width track element of a commercial endless tracked vehicle, that pad, then, could not be universal or usable with more than that one width.

FIGS. 23–25, INCLUSIVE

Figure 10:
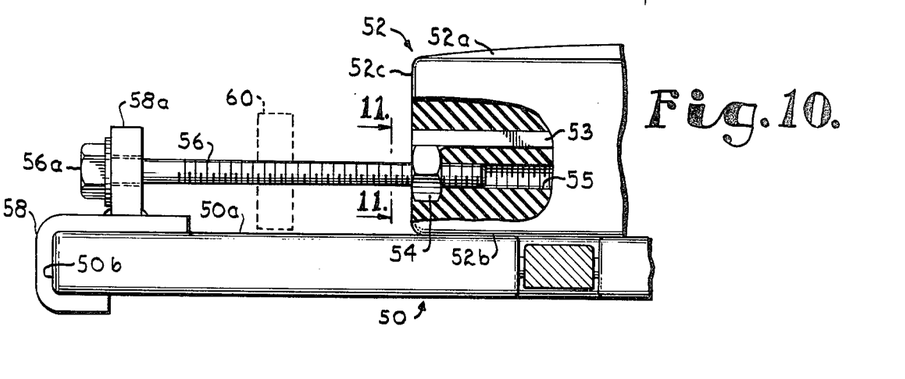
FIG. 10 is an enlarged, partially cut-away, fragmentary front view of the lefthand side of the construction of FIG. 9, particularly showing the engagement of the bolt with the connecting structure within the pad, as well as the recess left by molding the pad with the threaded member therethrough.
Figure 11:
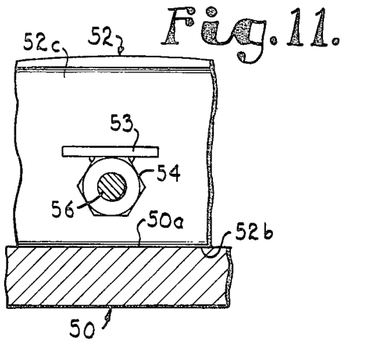
FIG. 11 is a view taken along the line 11—11 of FIG. 10 in the direction of the arrows.
Figure 23:
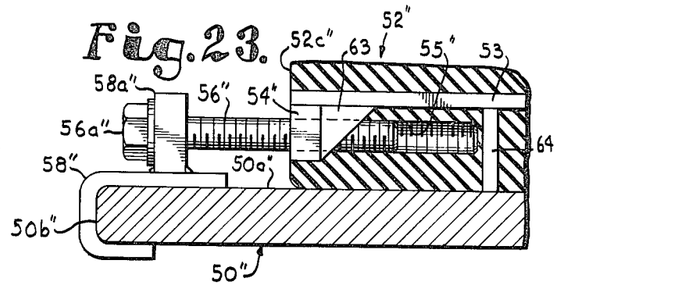
FIG. 23 is a side, partly sectional view of one end of a track pad on a track element, the view fragmentary, the connection of the pad to the track like that of FIGS. 9 and 10, additional means shown reinforcing the connection of the nut to the strap and also optionally positioned within the strap for orienting the strap during the molding process of the pad.
Figure 24:
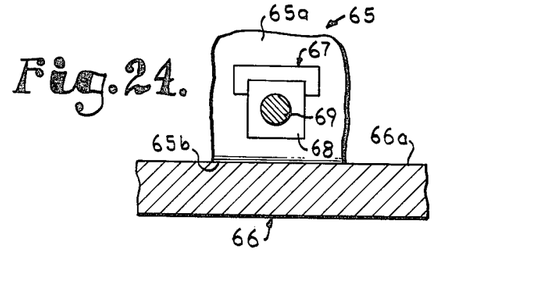
FIG. 24 is a fragmentary end view of a pad wherein a U-section channel replaces the flat bar, strip or strap of FIGS. 4 and 5.
Figure 25:
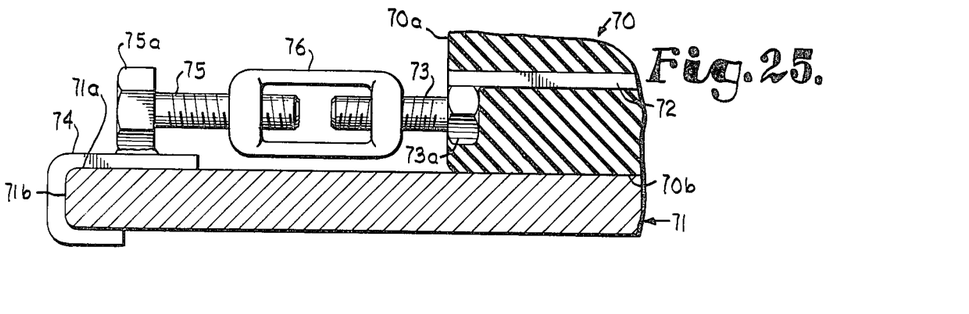
FIG. 25 is a fragmentary, partially sectional front view showing a bolt connection analogous to a connection seen in FIGS. 9 and 10, but wherein a turn-buckle means is employed to give variable adjustment and tightening.

FIGS. 23–25, inclusive show certain variations in the protective device configuration of FIGS. 7–11, inclusive which optionally may be employed In FIG. 23, a fragmentary view considerably like that of FIG. 10, there is shown one side sectional view of the track element side edge engaging means and, further, an enlarged detail of the engagement of the side portion of the pad, as well as details of the internal construction of the nonextendible means positioned therein. The structures of FIGS. 10 and 23 differ only in the following details. First, the bolt is shorter and thicker. Secondly, means are provided within the pad to reinforce the connection of the nut and the nonextensible strap received within and secured to the pad. Thirdly, there is provided an orienting brace member extending downwardly in the view from the inboard portion of the nonextensible strap in the pad. The purpose of the latter is to aid in positioning the nonextensible strap in the mold when the pad is formed around the strap, initially. The presence of a rigid centering member noted is not desirable as it adds additional rigid structure within the resilient block or pad and lessens its protective capacities, as well as limiting its placement with respect to the track element bolts.

In view of these few differences analogous or identical parts in FIG. 23 to those seen in FIGS. 7–11, inclusive, ar numbered the same, but double primed.

FIG. 23 additionally shows a pad 52″ which approaches relatively closely to hook member 58″ and the edge of track 50″, whereby, for that track element, to be a quite wide pad. In this modification, one or more flanges 63 may be welded to nut 54″ and nonextensible strap 53″ laterally of the nut (see FIG. 11) in order that, under great stress and tension, the nut 54″ will not be snapped off of or away from nonextensible element 53″.

It should be kept in mind that it is not only the tensioning stress of the bolts (such as 56″) being tightened down which work on nuts 54″, but also the weight, momentum, inertial, etc. of the vehicle itself as it works on canted surfaces, turns, accelerates and decelerates etc.. The provision of one or more positioning or locating flanges 64 in order to precisely orient nonextensible members 53″ in the block or pad 52″ in the molding process is greatly convenient, but not desired if members 64 are metal. However, they may be themselves of resilient plastic composition and thus both serve the locating purpose and not provide objectionable structure diminishing the resilience of the pad to the many and varied vectors and loads of force which fall thereon in a working situation.

FIG. 24 is an end view of a pad 65 having an end face 65a. Pad 65 rests on track element 66 which has outboard surface 66a on which the pad rests on inboard wall or face 65b thereof. A nonextensible member generally designated 67 and comprising a C-shaped channel member or iron is provided which extends from one side face 65a of block or pad 65 to the other. The purpose of channel 67 with its downwardly extending right angle legs is to provide the extra bracing for the nuts 68 which are welded or otherwise fixedly attached thereto at the ends of channel 67. Bolts 69 threadably engage the nuts 68. The channel 67 thus provides additional strength at the nut connections analogous to flange 63 in FIG. 23. However, the channel 67, is of metal such as steel, does not have the resiliency or arcuate give of spring steel straps 31 and 53 of the previous figures under the heaviest loads and stresses. Nevertheless, this sort of structure, which is surrounded by the relatively resilient block or pad still is able to preserve the desired and necessary protective features of the pad, while providing immense strength against the many and varied loads of tensioning the pad on the track element, heavy acceleration and deceleration of the vehicle, high speed twisting and turning of the same, canted or angled operation of the vehicle and the like. This member, as is the case to a somewhat lesser degree of the construction of FIG. 23, also provides a greater bond connection of the center nonextensible member with the pad than the straps of, say, FIGS. 1-11, inclusive.

The positioning members 64 of FIG. 23, preferably of resilient, deformable, crushable plastic material, may be employed with the channel of FIG. 24 in the fabrication or molding process of the pad, and, as well, with the nonextensible members 31 and 53 of FIGS. 1-11, inclusive in their fabrication and formulation.

In FIG. 25 there is shown a view like those of FIGS. 10 and 23, namely, a fragmentary section through a track element showing the edge connecting means, the nonextensible element in the pad and the connecting and tensioning means therebetween. This figure differs in that, while it is variably length-adjustable in the manner of, say, the structures of FIGS. 10 and 23, this variable length adjustment is provided by a turnbuckle configuration of conventional sort.

Pad 70 has side face 70a and inboard face 70b. It is shown, in FIG. 25, as mounted on individual track element 71 which has outboard face 71a. Positioned within pad 70 and preferably integrally fixed, glued, bonded or otherwise attached thereto is a nonextensible bar or strip 72 of the type seen at 31 and 53, namely, preferably, spring steel or some other optionally laterally or transversely resilient, but nonextensible. Welded or otherwise fixedly attached to the inboard end faces thereof are the enlarged heads 73a of threaded bolts 73. Again, it is noted that nonextensible strap 72 may extend out past the side face 70a of pad 70 so that the entire bolt and its head 73a are free of the pad (see member 31), but this is not necessary. Reinforcing flanges like member 63 may be employed associated with the bolthead. Strap 72 may be a channel like 67 in FIG. 24.

J-configured hook member 74 is adapted to engage the side edge 71b of track element 71 as seen in the view, having the enlarged head 75a of threaded bolt 75 welded or otherwise fixedly attached thereto. Reinforcing flanges may be employed on the hook member 74 to secure the bolthead 75a to hook 74. A turnbuckle collar of conventional form 76 threadedly engages the opposed threads of bolts 73 and 75 whereby to alternately tighten and loosen the connection between bolts 73 and 75, thereby to tension the pad 70 on the track and release same. This gives length variability of adjustment, also.

It should be understood with respect to the bolt-nut engagement of FIGS. 7-11 and 23, as well as the turnbuckle connection of FIG. 25 that same do not need to be on both sides of the pad to provide either length adjustment or tightening capacity. Specifically, that is, a hook element analogous to member 33 of FIGS. 7-11, inclusive may be substituted for one such turnbuckle unit or nut-bolt-hook connection of the other figures. Still further, while the hook elements 58 and 59 of FIGS. 7-11, inclusive, 58' of FIG. 23 and 74 of FIG. 25 are shown as extremely closely and tightly engaging the side edges of the track elements, such is not necessarily the case, although it is much preferably. In the case of aggregate, tar, mud and the like on the track elements it may be desirable that the hook elements be slightly or somewhat larger in their gap or opening than the thickness of the track.

FIGS. 19-22, INCLUSIVE

These figures show the employment, with the subject track pads and road protective devices, or resilient nonextensible members, as contrasted with the essentially rigid (when steel, for example) straps or bars 31 and 53 (also 72) of the previous figures. In working vehicles with acceleration and deceleration, rough and rocky surfaces, angled working surfaces, turning and twisting, cant or rotation of tracks, reversal of tracks, etc., and the like, as well as heavy loading and high speeds, it is nearly impossible to predict what combinations of these factors will produce by way of forces acting on the pads the nonextensible members therein, the edge connecting means and the tensioning and connecting means communiciating between the track edges and the pad or block sides. At all times, however, the working load is falling on, into and through the block or pads themselves.

Figures 17, 19, 20:
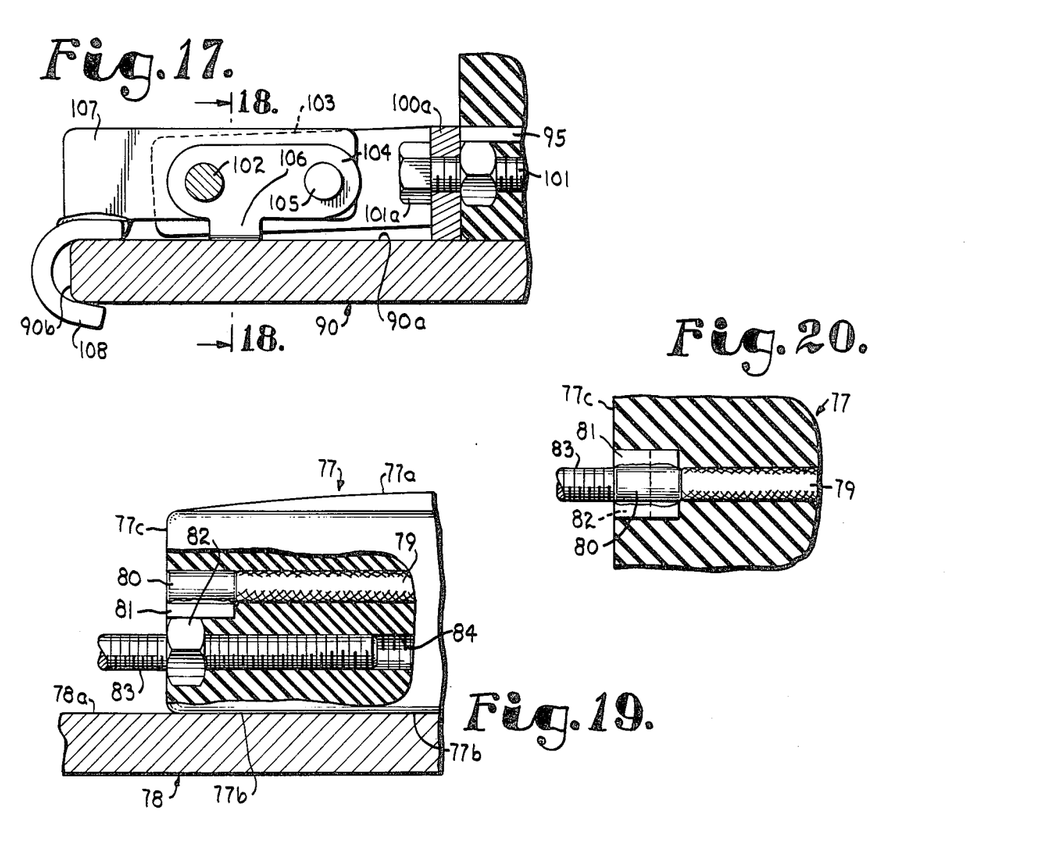
FIG. 17 is a view like that of FIG. 16, but with the over-center means and mechanism fully activated and locked.
FIG. 19 is a fragmentary view of one end of a road protecting device or pad (fragmentary front view) with portions thereof cut-away to show a cable-type nonextensible connecting means positioned within the pad, there being a nut welded to a plate fixed to the end of the cable, the nut engaged by a bolt in the manner of the device of FIGS. 9 and 10.
FIG. 20 is a fragmentary top or plan view of the construction of FIG. 19 taken in horizontal section of the pad.
Figure 18:
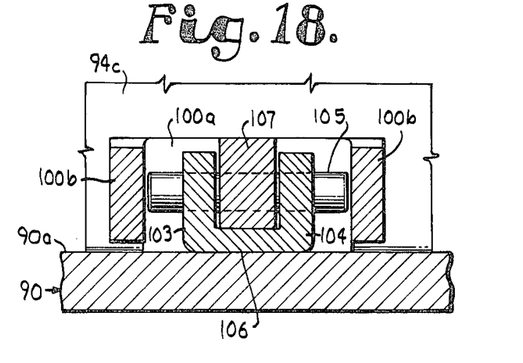
FIG. 18 is a view taken along the line 18—18 of FIG. 17 in the direction of the arrows.
Figure 21:
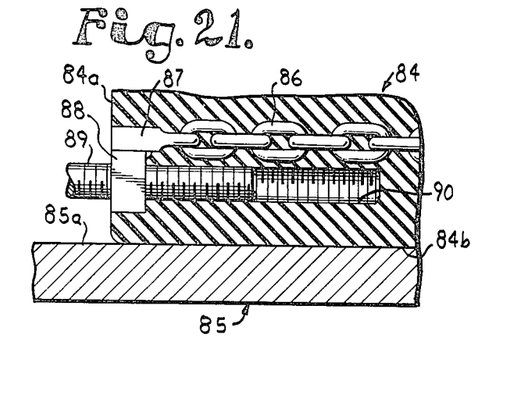
FIG. 21 is a view like that of FIG. 19, but with the cable element being replaced by a chain.
Figure 22:
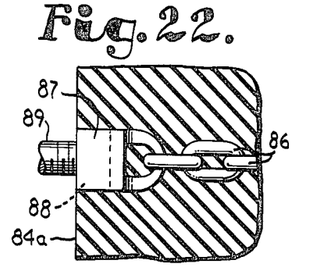
FIG. 22 is a fragmentary top view of the device of FIG. 21 taken in horizontal section of the pad.

The means, then, of FIGS. 20-22, inclusive (cables and chains) operating as nonextensible means provide workability or yielding of the nonextensible means in the pad, without losing the essential, basic nonextensible characteristic which enables the pad or block to be rigidly tensioned and snubbed down on the track.

Referring to FIGS. 19 and 20, therein is seen a pad 77 having an outboard surface 77a, an inboard surface 77b and a side wall or surface 77c. This pad is mounted on track element 78 which has outboard surface 78a. Cable 79 has metal collar 80 seized, fixed, welded or otherwise fixedly attached to the end thereof, to which is welded or otherwise fixedly attached plate or table 81. Welded or otherwise fixedly attached to plate 81 is nut 92 which receives the externally threaded shaft of bolt 83. Pad 77 is additionally provided with preformed passages 84 thereinto to receive a greater or lesser length of bolt 83. The operation of this form is the same as FIGS. 7-11, inclusive.

Optionally, but not shown, plate 81 may have a nut 73 (FIG. 25) welded or otherwise fixedly attached thereto for the turnbuckle-type engagement. Further alternatively, but not shown, plate 81 may extend outside the face of pad 77 and have a slot therein like the slots 32 in extensions 31a and 31b of FIG. 4. In such case, same could engage a hook member 33 or a compression spring member 34 as in FIGS. 4 and 5. The cable 79 itself may be of such length that collar 80, plate 81 and nut 82 are positioned laterally of face 77c, if desired.

Referring to FIGS. 21 and 22, therein is seen a pad 84, generally designated, having a side face 84a and inboard wall or face 84b. Pad or block 84 is shown secured to the inboard face 85a of track element 85. Positioned and preferably integrally molded within or formed within pad or block 84 is a high-strength, such as alloy steel, chain 86 made up of a plurality of interengaging lengths and having platform-providing end lengths 87 thereof at the ends of the chain and side faces 84a of the pad. Welded or otherwise fixedly attached to the inboard faces of lengths 87 are nuts 88 which operate to threadably receive bolts 89. Passages 90 are preferably preformed in pad 84 inboard of chain 86. The length variability of chain 86 is the same as cable 79 of FIGS. 19 and 20. Reinforcing flanges may be provided with respect to plates 81 and 87 to secure nuts 82 and 88 with respect thereto. The operation of this form is the same as FIGS. 7-11, inclusive.

The bonding of straps 3, 53 and 72 (also 95 to be described), channel 67, cable 79 and chain 86 into their respective pads is important to avoid longitudinal pullout thereof. In order to provide secure anchoring of the said nonextensible elements with the pad, transverse plates or elements (to their longitudinal axes) may be fixed or welded thereto so as to give greater anchoring and securement in the fabrication or molding process. Such elements are not illustrated in the views.

FIGS. 12-18, INCLUSIVE

The devices of FIGS. 1-6, inclusive, because of the snap-on character of the one or more compression spring units, possessed the capacity of being very swiftly snapped on to and removed from the track elements. However, in the case of the compression spring units this requires considerable effort of the operator to sufficiently collapse the springs in application and removal and, additionally, does not provide a solid connection. On the other hand, the devices of FIGS. 7-11, inclusive and 19-26, inclusive provide rigid connections of a power and strength, both with respect to tensioning and fixing of position, far beyond the capacity of almost any even semiresilient pad or block, however fiber or fabric reinforced, to excel or exceed under the hardest working conditions. However, those latter connections, while versatile, strong and length-adjustable, generally require considerably more time to mount, demount, tension and release. This is because suitable wrenches and tools must thread down and back the bolt members, turnbuckles, etc., It is thus desirable to provide a massive, ultimate-strength connection with the power, ruggedness and endurability of the latter devices, but additionally possessing the capacity of high speed, reasonable effort mounting and demounting or attachment and release. This includes both connection and tensioning of the pad assembly on the track elements as well as release thereof.

The latter purposes are entirely achieved by the use of the over-center mechanism particularly illustrated in FIGS. 12-18, inclusive, as well as its associated variable-length adjustment connector on the other side thereof.

It must be understood, additionally, that all of the road protecting device attachment means, connectors and tensioners shown and described in the instant disclosure (for working road protective devices) share certain common characteristics. First, they all include a nonextensible means or member within or associated with the pad which carries connecting members or engaging members on the side ends or extremities thereof. Secondly, there are means which engage the side edges of the track element and connect the entire assembly thereto. Thirdly, there are connecting and tensioning means between the latter means and the nonextensible means engaging, with the outboard ends thereof, the track element edge engaging hooks or connectors and, with the inboard portions thereof, the nonextensible means themselves or the engaging members on the extremities thereof. All of the entire connecting assemblies are received within and below the profile of the pad so that a considerable resilient portion of the pad extends both over and forward and backward thereof. Yet further, with respect to the nonextensible means, the resilient pad extends between the same and the outboard face of the track element on which the pad or block is carried. The pad additionally may be, in most cases, variably adjusted laterally, as previously described and as will be described, so as to give versatility to a given width block or pad and its assemblage or engaging, connecting and tensioning means, with respect to being able to be used with more than one width or endless track elements.

Referring, then, to FIGS. 12-18, inclusive, therein is shown a track element generally designated 90 having an outboard surface 90a, side edges 90b and a cleat 91 thereon. The leading and trailing edges of the track element 90 are 90c and 90d, respectively. A normally trailing track element 92 and a normally leading track element 93 of like configuration, each element making up parts of the endless track, are coupled therewith and to conventional drive mechanism in conventional manner.

A track pad, block or protective device of a character previously described is generally designated 94, in these views, having an outboard surface 94a, front and rear end faces 94b, side faces or walls 94c and an inboard wall or face 94d. Preferably molded integrally into pad or block 94 and extending substantially centrally thereof from side to side is nonextensible, optimally spring steel strap 95. Welded or otherwise fixedly attached to the inboard ends of strap 95 are nuts 96. It should be understood that strap 95 and nuts 96 may be replaced by any of the equivalent members of FIGS. 19-24, inclusive, for example. The pad as just described is no different from the pad of FIGS. 7-11, inclusive. Preformed passages 97 are preferably additionally provided.

Figure 12:
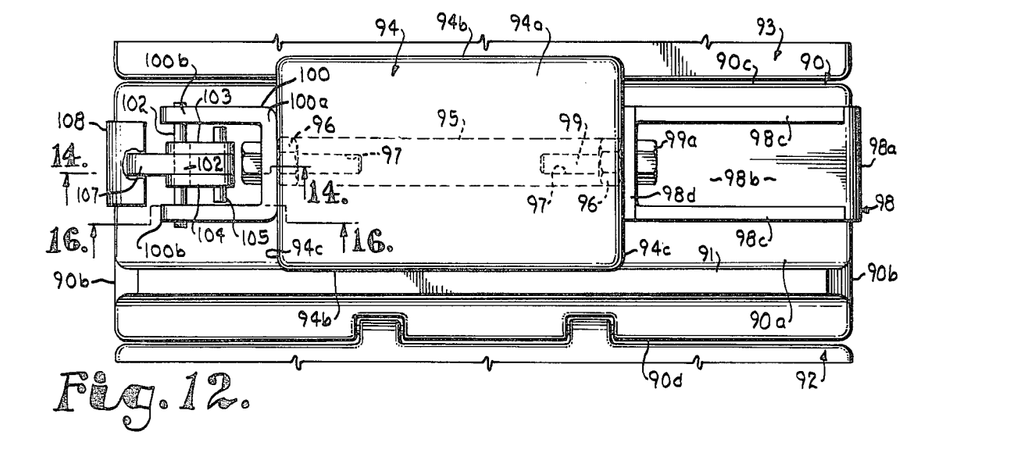
FIG. 12 is a plan view of a track element having a road protecting pad of the same construction as the pads of FIGS. 8-11, inclusive mounted thereon, a modified connecting means shown in the left hand portion of the view utilizing an over-center mechanism, the righthand side having a modified, reinforced, length-adjustable bolt-bracket connection to the track element side edge. The entire device is shown fully engaged with the track element.
Figure 13:
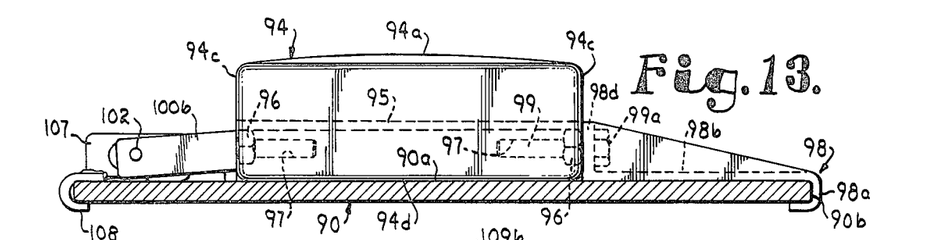
FIG. 13 is a front view of the pad and connection means of FIG. 12 also fully engaged with the track element.

To the right in FIGS. 12 and 13 there is provided a hook member, generally designated 98, of extremely great strength having outboard C-section track edge engaging portion 98a, flat plate portion 98b, edge reinforcing flanges 98c and inboard end wall 98d, members 98c and 98d welded or otherwise fixedly attached to one another and extending normal to plate 98b. A passage, not seen, is provided centrally through inboard wall 98d whereby to receive therethrough the threaded shaft of bolt 99 having enlarged head 99a. Bolt 99 threadedly engages nut 96 in the righthand side of the view of FIGS. 12 and 13, thus giving variable length adjustment on that side. Alternatively, hook member 98 may be welded or otherwise fixedly attached to the outboard end of nonextensible element 95 and nut 96, but this prevents fine length adjustment of universality of the road protective device assembly of these figures.

Turning to the over-center leverage and connection means of these views, a U-shaped member 100 having inboard plate 100a and outwardly extending legs 100b is removably and length-adjustably connected to one side of the pad by bolt 101 having enlarged head 101a. Bolt 101 threadably engages nut 96 on strap 95 and extends through a central passage (FIG. 14) in plate 100a. Shaft 102 is next to and extends beyond opposed legs 100b of U-member 100. Paired plates 103 and 104 are mounted at their outboard ends (when the over-center device is locked) on shaft 102, rotating thereon and are connected at their inboard ends (when the over-center device is locked as in FIG. 17) to shaft 105. They are also interconnected, one to the other, on their track element adjacent side (when the overcenter device is locked) by plate 106.

Figure 14:
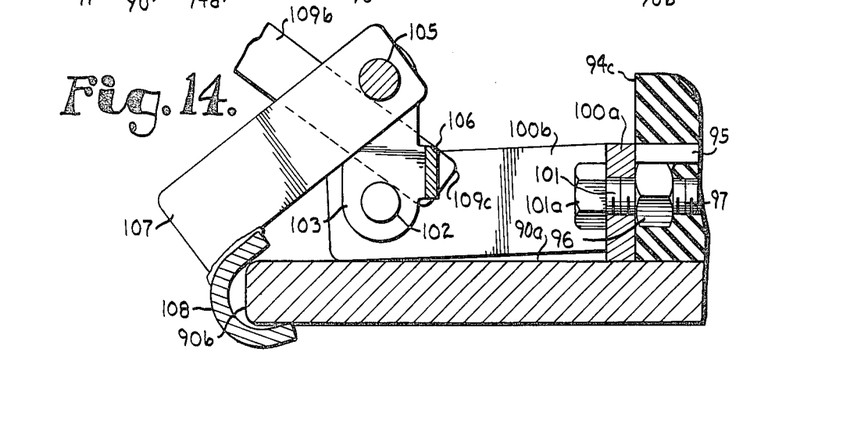
FIG. 14 is a view taken along the lines 14—14 of FIG. 12 in the direction of the arrows, but with the over-center mechanism not fully activated.

Positioned between plates 103 and 104 and rotatably mounted at its inboard end on shaft 105 is bar or plate 107, which is welded or otherwise fixedly attached at its outboard end to C-section hook member 108.

Figure 15:
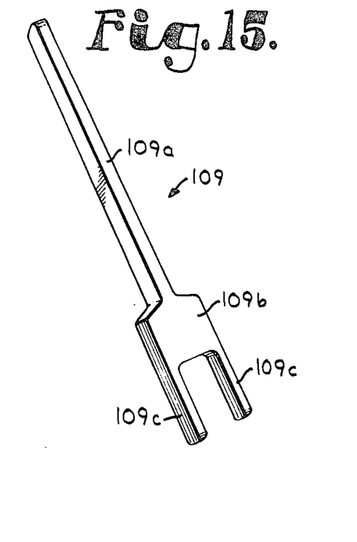
FIG. 15 is a three-quarter perspective view of the activating lever for the over-center mechanism of the device of FIGS. 12-17, inclusive.

In FIG. 15, there is shown the activating lever for the over-center device of these figures comprising a handle 109a, a transverse beam 109b and spaced engaging and actuating arms 109c, the lever generally designated 109.

To apply the assemblage of FIGS. 12-18, inclusive, the operator couples the hook member 98 and the over-center device to the nuts 96 by bolts 99 and 101, respectively, unless such are already connected. The over-center mechanism is typically opened up even more than seen in FIG. 14 with shaft 105 arcuately further counter-clockwise around shaft 102 to move member 107 and hook 108 further to the left in the view. Hook member 98 is engaged with the track edge 90b with hook 98a and, on the other side of the track element, the hook 108 is moved into engagement with the other track edge 90b to the position seen in FIG. 14. It should be understood with respect to all of the road protective assemblies of this entire disclosure that, typically, there is an inboard side to each of the two endless tracks and an outboard side. Ready access is had to connecting means, bolts, variable length adjustments, compression spring units, etc. on the outboard side of the track. On the other hand, at the inboard side of the track, ready access is not had to such things as the operator will have to climb up on the track, lean thereover, go around to the front or back thereof, or deal with the presence of the body or engine of the bulldozer or tractor, etc.. Accordingly, a simple hook element engagement of the inboard side of the endless track elements such as by element 98 of these figures or hook member 33 of FIGS. 1-6, inclusive is generally far most convenient. Said otherwise, it is desirable to have as much as possible of the length or width-adjusting means and tensioning means on the outboard side of the track as possible.

With the elements of the over-center device in the position of FIG. 14, the tines or arms 109c of member 109 may be thrust between shafts 102 and 105, inboard of arms 100b of member 100 and outboard of plates 103 and 104. The length of shaft 105 which causes it to protrude beyond plates 103 and 104 is deliberate to give bearing and camming surface to tines 109c in actuating and releasing the over-center device of these figures.

Figure 16:
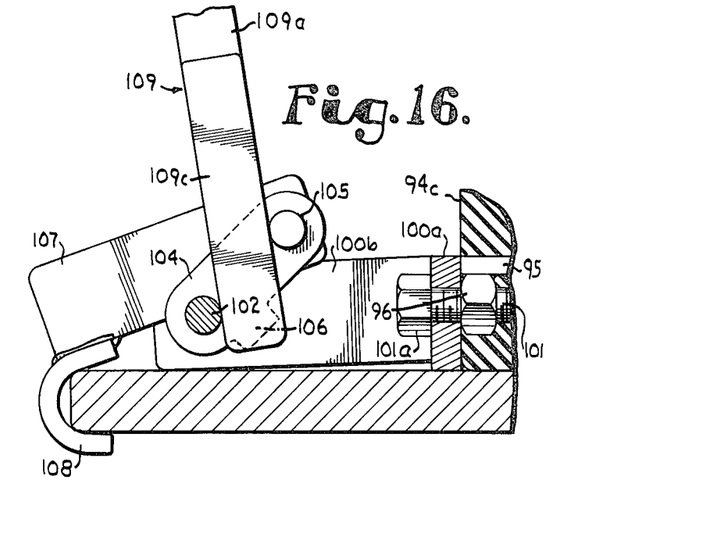
FIG. 16 is a view like that of FIG. 14, but with the over-center mechanism in the left portion of the views of FIGS. 12 and 13 more fully activated, but not completely so. This is a view taken along the lines 16—16 of FIG. 12 in the direction of the arrows.

With member 109 and tines 109c thereof in the position of FIG. 14, the operator, by trusting clockwise (FIG. 14) on handle 109a rotates the elements of the over-center device around shaft 102 to the position of FIG. 16 which is just short of going past the lock plane of the over-center device. The latter is through the hook 109 engagement, shaft 102 and shaft 105. Therefore, further clockwise levering of handle 109a around the fulcrum of shaft 102 and operating against the outer ends of shaft 105 drives the overcenter mechanism past the locking line or plane previously mentioned and into final locking position as seen in FIG. 17. Note that the parts of the over-center device are preferably so configured that, in the starting position of FIG. 14, the outboard portions of arms 100b bottom out on the track element outboard face 90a. In locked position of FIG. 17, member 106 abuts the outboard face 90a of element 90.

In order to decouple the over-center unit, disengaging hook 108 with track element edge 90b, tines 10c are thrust between shafts 102 and 105 inboard of plates 100b and outboard of plates 103 and 104, and shaft 105 and the members connected thereto (plates 103 and 104 and member 107) levered counterclockwise in FIG. 17 around shaft 102. In this operation, the parts of the over-center device (although not member 109) assume the successive positions of FIGS. 16 and 14, in that order.

Once the over-center device is locked down, as described, the ultimate tension and tightness of the whole device on the track may be varied to a small degree by rotating bolt 101 and to a much degree by rotating bolt 99.

FURTHER GENERAL CONSIDERATIONS

From the foregoing, it will be seen that road protective devices and means for attaching, connecting and tensioning same on individual track elements of endless tracks have been provided which are not imited to short periods of use such as street crossings and ight duty work. Instead, such road protective devices and means have been provided which can be applied to the tractor to removed therefrom in relatively short periods of time, but yet which are extraordinarily strong and durable and will stay on under almost any working circumstances without any worry of unexpectedly losing one or more of the pads.

As a specific example of a working pad (according to the disclosure of FIGS. 7-11, inclusive), the following is recited. A block of styrene butadiene rubber approximately 9 inches wide, 3 inches thick and 5-$\frac{3}{4}$ inches long is employed. Molded inside the block of rubber is a $\frac{1}{4} \times 2$ inches strap of spring with an oversized $\frac{3}{4}$inch nut securely welded to each end of the strap, but fully enclosed within the rubber block or pad. Inboard and outboard (with respect to the endless track) attachment clamps approximately 2$\frac{1}{2}$ inch wide and made of $\frac{1}{4}$ inch thick steel fit over the outside edge of the grouser or element on each side thereof. Each clamp has a $\frac{1}{4} \times 2\frac{1}{2} \times 1\frac{1}{2}$ inch bar or plate securely welded to the top thereof having a $\frac{3}{4}$ inch hole centered in same. A $\frac{3}{4}$ inch heat treated bolt is inserted through the hole in the plate or bar, operatively screwing into the nuts inside the pad.

Once such a pad assembly is set up for a particular width of grouser shoe, in order to install or detach the pads, the outboard bolt need only be tightened or loosened approximately $\frac{3}{4}$ inch.

In testing, with respect to the particular pad and attachment described, with tractors weighing 12 tons or less, one pad on every other grouser is generally sufficient. However, with tractors weighing over 12 tons, we strongly recommend one pad on every grouser. The 9 inch width pads or blocks can be used on single or double grouser shoes with a width from 12 inches to 22 inches. The same attachments can be used on the various widths of tracks by shortening or lengthening the $\frac{3}{4}$ inch attachment bolts. The pads can be moved from inside to outside of the grouser simply by adjusting the length of the bolt on either or both ends. For tractors with grouser shoes that are over 20 inches width, pads 14 inches long, 3¼ inches thick and 17 inches wide, may be employed by the same manner of attachments, but with the inner nonextensible strap, molded inside the pad, provided in a much heavier construction.

The subject devices have been tested in actual use in numerous heavy working applications. Specifically, one application involves their use on D7 Caterpillar bulldozers and tractors having endless tracks with side mounted booms for handling heavy pipe. These vehicles approach 37,500 lbs. without any load and, loaded, go well over 40,000 lbs.. In street work, the vehicles, in handling the pipe, are often tilted at a 30° angle with one track on a mud pile and the other on the street. Even utilizing the powerful compression spring units of FIGS. 1–6, with such great loads and angular workings, problems with strain on the springs and collapsing of same when the tractors were canted indicated that even this rugged snap-on form was not satisfactory for such extreme loads. The solid mountings of the other figures of this application, however, handle even this type of heavy work on a continuous day to day basis, thus enabling the complete avoidance of destruction and tearing up of the street surfaces on which the vehicles and devices work. Accordingly, means and mechanisms, as well as connections and road protecting devices have been provided which permit continuous, long-term, working duty on massive, very heavy-duty work tractors and bulldozers. Pads of lesser width, in these vehicles, may be translated laterally to the outboard sides of the tracks and thus protect the streets even from the edges of the tracks when the vehicle is tilted at an angle.

It should further be emphasized that these track pad assemblies and road protecting device units, here shown and described, permit working off-road use, as well as working use on finished or gravel or dirt roads. Thus the units or protectors can be retained on the tracks when moving from one road surface to another or from one work area to another even where the transit is across muddy or rough terrain, etc..

It should be additionally kept in mind, with respect to the importance of having resilient material on the underside of the pad next to the track plate element that there is universally going to be several, typically four, grouser bolt heads extending upwardly from the face of the plate. In the situation where there is a steel plate on the underside of the resilient pad, such as in some of the prior art patents, same must be relieved to receive those boltheads. This relief also does not permit lateral adjustment of the said underplated pads on the grouser. This is not the case in the subject pad as, in all circumstances, there is sufficient resiliency on the underside of the pads to receive the said boltheads and also permit the lateral adjustment of the pad over such boltheads. Also, when the operator tightens the bolts, say of the forms of FIGS. 7–11, inclusive to 100 lbs. torque, the pads will snug down over the boltheads, tensioned onto the track element outer face.

The breakover or over-center device of FIGS. 12–18, inclusive typically needs 4 inches in which to perate. Accordingly, a 9 inch pad would typically require a 16 inch or over track width using such a device. With the lesser width connecting and tensioning means such as that seen FIGS. 7–11, incusive, a 9 inch width pad or block would be usable on a 12 inch through a 22 inch width track element. In such case, the versatility of a single width pad is seen as, with the same pad and same attachments, the difference would lie only in the bolt length to have effective connecting and attaching means. The presence of safety and protective nuts 60 and the staggering of the pads thereseen in FIG. 26 both enhance the extreme versatility of the small width pad on a wide width track element.

In addition to the edge connecting hooks or means and the lateral adjustment and tensioning means being positioned entirely laterally of the pads, per se, as well as below the profile thereof and centrally thereof (in plan view), it is also most desirable that as much as possible of these elements be below the profile of the cleats on the grouser plates. Thus particularly see FIGS. 5, 6, 9 and 13.

Under certain circumstances of connection using the device or devices of FIGS. 7–11, inclusive and 19–22, inclusive and 25, tensioning of the pads onto the track by turning down the turnbuckles or bolts may cause some slight bowing of the pad if the nuts attached to the straps, cables, chains, etc. have the axis thereof considerably displaced from the longitudinal axis of the strap, cable, etc.. Accordingly, the nuts may be welded or attached with respect to the nonextensible elements so that the longitudinal axis of each of them is as close together as possible to provide a minimum lever arm involving such connection. The only objectionable feature in such case is the possible provision of a non-flat upper surface which might wear a portion of the pad excessively on the outwardly bowed part. Accordingly, the channel of FIG. 24 or braces as in FIG. 23 may be employed or a heavier strap, if required.

On lesser width track elements, typically, the boltheads extending outwardly from the outward face of the track elements will fall between the threaded engaging elements or nuts of, for example, the device of FIGS. 7–11, inclusive. This is particularly true on center mountings of the pads. On greater width tracks, the boltheads are typically spaced forward and backward of the said threaded engaging elements. Thus there is little difficulty in the tightening (snuggly) the pads down over such bolt heads.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. Track and road protecting means for use with individual track elements of an endless tracked vehicle, successive track elements of said endless track having a transverse cleat on the outboard surface thereof adjacent one end therefore, comprising, in combination:

a somewhat resilient, somewhat flexible, somewhat deformable, yet normally substantially shape-retaining block under load adapted to fit on the outboard face of a single track element of an endless track and positioned thereon, said block substantially rectangular in plan, side and end views and having substantially rectangular, paired and parallel sets of side faces, end faces and inbaord-outbard load bearing faces, the length of said block a substantial part of the distance from cleat to cleat of successive elements.

the height of the block substantially greater than the cleat height from the clean outboard surface of the track element, and the width of the block at least a substantial part of the width of the track, an elongate, non-extensible element received substantially centrally of and secured within said block and extending transversely thereof from side to side of the block, means for removably connecting the said non-extensible element to the opposite edges of an individual track element positioned laterally of each of the side faces of said block, and tensioning means positioned laterally of the block on each side thereof engaging one end of the said non-extensible element with an inward portion thereof and the connecting means with an outward portion thereof, one of said tensioning means incuding a nut fixed to one end of the non-extensible element and a bolt carried by and engaging the connecting means on one side of the block.

2. Track and road protecting means for use with individual track elements of an endless tracked vehicle, successive track elements of said endless track having a transverse cleat on the outboard surface thereof adjacent one end thereof, comprising, in combination:

a somewhat flexible, somewhat deformable, yet normally substantially shape-retaining block under a load adapted to fit on the outboard face of a single track element of a endless track and positioned thereon, said block substantially rectangular in plan, side and end views and having substantially rectangular, paired and parallel sets of side faces, end faces and inboard and outboard load bearing faces, the length of said block a substantial part of the distance from cleat to cleat of successive track elements, the height of the block greater than the cleat height from the clean outboard surface of the track element, and the width of the block at least a substantial portion of the width of the track, an elongate, non-extensible element received substantially centrally of and secured within said block and extending laterally thereof from side to side of the block, means for removably connecting said non-extensible element to the opposite side edges of an indivdual track element positioned laterally of each of the side faces of said block, tensining means laterally positioned of one side face of said block with the inward portion thereof connected to one end of the said non-extensible element and the outward portion thereof engaging one connecting means, and rigid coupling means laterally positioned of the other side face of said block with the inward portion thereof connected to the other end of the non-extensible element and the outward portion thereof engaging the other connecting means, said tensioning means including a nut fixed to one end of the non-extensible element and a bolt carried by the removable connecting means on one side of the block.

3. Track and road protecting means for use with individual track elements of an endless tracked vehicle, successive track elements of said endless track having a transverse cleat on the outboard surface thereof adjacent one end thereof, comprising, in combination:

a somewhat resilient, somewhat flexible, somewhat deformable, yet normally substantially shape-retaining block under load adapted to fit on the outboard face of a single track element of an endless track and positioned thereon, said block substantially rectangular in plan, side and end views and having substantially rectangular, paired and parallel sets of side walls, end walls and inboard-outboard load bearing walls, the length of said block a substantial part of the distance from cleat to cleat of successive track elements, the height of the block substantially greater than the cleat height from the clean outboard surface of the track element, and the width of the block at least a substantial part of the width of the track, an elongate, non-extensible element received substantially centrally of and secured within said block and extending laterally thereof from side to side of the block, individual hook means positioned laterally of each of the side walls of said block in positive, removable engagement with the track element side edge, and a separate connecting element communicating between and interconnecting each said individual hook means and one end of said non-extensible element, said separate connecting elements, in the said connection between said hook means and said elements, placing said block under tension against said track element, whereby to retain said block positioned on the outboard face of said track element, one of said connecting elements including a nut fixed to one end of the non-extensible element and a bolt carried by and engaging the said hook means on one side of the block.

* * * * *